US006490395B1

(12) United States Patent
Nara et al.

(10) Patent No.: US 6,490,395 B1
(45) Date of Patent: Dec. 3, 2002

(54) ARRAYED WAVEGUIDE GRATING AND METHOD FOR COMPENSATING OPTICAL TRANSMITTING CENTER WAVELENGTH OF LIGHT TRAVELING THROUGH THE SAME

(75) Inventors: Kazutaka Nara, Tokyo (JP); Takeshi Nakajima, Tokyo (JP); Tsunetoshi Saito, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 83 days.

(21) Appl. No.: 09/667,563

(22) Filed: Sep. 22, 2000

(30) Foreign Application Priority Data

Sep. 24, 1999 (JP) ............................................. 11-270201
Jan. 31, 2000 (JP) ........................................ 2000-021533
Jul. 19, 2000 (JP) ........................................ 2000-219205

(51) Int. Cl.[7] ................................................. G02B 6/26
(52) U.S. Cl. ............................. 385/39; 385/15; 385/24; 385/37
(58) Field of Search .............................. 385/15, 24, 37, 385/39, 46

(56) References Cited

U.S. PATENT DOCUMENTS

| | | | | | |
|---|---|---|---|---|---|
| 5,617,234 | A | * | 4/1997 | Koga et al. ................... | 359/131 |
| 6,137,939 | A | * | 10/2000 | Henry et al. .................. | 385/132 |
| 6,188,818 | B1 | * | 2/2001 | Han et al. ...................... | 385/24 |
| 6,222,963 | B1 | * | 4/2001 | Grand et al. ................... | 385/39 |
| 6,243,514 | B1 | * | 6/2001 | Thompson .................... | 385/37 |
| 6,289,147 | B1 | * | 9/2001 | Bulthuis et al. ............... | 385/24 |
| 6,304,687 | B1 | * | 10/2001 | Inoue et al. ................... | 385/14 |

FOREIGN PATENT DOCUMENTS

| | | |
|---|---|---|
| JP | 11-218639 | 8/1999 |
| JP | 2000-292632 | 10/2000 |

OTHER PUBLICATIONS

U.S. patent application Ser. No. 09/667,563, filed Sep. 22, 2000, pending.
U.S. patent application Ser. No. 10/058,085, filed Jan. 29, 2002, pending.
U.S. patent application Ser. No. 09/741,824, filed Dec. 22, 2000, pending.

(List continued on next page.)

Primary Examiner—Akm E. Ullah
Assistant Examiner—Jennifer Doan
(74) Attorney, Agent, or Firm—Oblon, Spivak, McClelland, Maier & Neustadt, P.C.

(57) ABSTRACT

An arrayed waveguide grating including at least one first optical waveguide, a first slab waveguide, a plurality of arrayed waveguides, a second slab waveguide, and a plurality of second optical waveguides. The plurality of arrayed waveguides are connected to the at least one first optical waveguide via the first slab waveguide. Each of the plurality of arrayed waveguides has a different length. The plurality of second optical waveguides are connected to the plurality of arrayed waveguides via the second slab waveguide. At least one of the first and second slab waveguides is partitioned to first and second segments at a partition surface intersecting a path of light which travels through the arrayed waveguide grating. At least one of the first and second segments is configured to be slid along the partition surface to compensate an optical transmitting center wavelength of the light according to a temperature of the arrayed waveguide grating.

21 Claims, 8 Drawing Sheets

OTHER PUBLICATIONS

U.S. patent application Ser. No. 10/026,722, filed Dec. 27, 2001, pending.
U.S. patent application Ser. No. 09/986,029, filed Nov. 7, 2001, pending.
U.S. patent application Ser. No. 10/020,220, filed Dec. 18, 2001, pending.
U.S. patent application Ser. No. 09/904,847, filed Jul. 16, 2001, pending.
U.S. patent application Ser. No. 09/955,120, filed Sep. 19, 2001, pending.
U.S. patent application Ser. No. 09/660,942, filed Sep. 13, 2000, pending.

* cited by examiner

ARRAYED WAVEGUIDE GRATING AND METHOD FOR COMPENSATING OPTICAL TRANSMITTING CENTER WAVELENGTH OF LIGHT TRAVELING THROUGH THE SAME

CROSS-REFERENCES TO RELATED APPLICATIONS

The present application claims priority under 35 U.S.C. §119 to Japanese Patent Application No. 11-270201, filed Sep. 24, 1999, entitled "Arrayed Waveguide Grating", Japanese Patent Application No. 2000-021533, filed Jan. 31, 2000, entitled "Arrayed Waveguide Grating", and Japanese Patent Application No. 2000-219205, filed Jul. 19, 2000, entitled "Arrayed Waveguide Grating". The Contents of these applications are incorporated herein by reference in their entirety.

BACKGROUND OF THE INVENTION

1. Field of the Invention

The present invention relates to an arrayed waveguide grating (AWG) which is used as, for example, an optical multiplexer or demultiplexer. Further, the present invention relates to a method for compensating an optical transmitting center wavelength of light which travels through an arrayed waveguide grating.

2. Discussion of the Background

In the field of optical communications, active researches and developments of the WDM (Wavelength Division Multiplexing) optical communications have been made over the recent years in order to dramatically increase transmission capacity. According to the WDM optical communications, for example, plural fluxes of light having different wavelengths are transmitted in multiplexing. The WDM optical communications system includes an optical transmitting device that transmits only the beams of light having predetermined wavelengths in order to extract the light beam of each wavelength from the multiplexed beams at a light receiving side.

FIG. 11 shows an arrayed waveguide grating (AWG) of a planar lightwave circuit (PLC) by way of one example of the optical transmitting device. The arrayed waveguide grating has a waveguide pattern as illustrated in FIG. 11. The waveguides include cores and claddings composed of silica-based glass or the like. The waveguides are provided on a substrate 1 which is made of silicon or the like.

In the waveguide pattern of the arrayed waveguide grating, a first slab waveguide 3 is connected to an exit side of one or more optical input waveguides 2 provided in a side-by-side relation. A plurality of arrayed waveguides 4 provided side by side are connected to an exit side of the first slab waveguide 3. A second slab waveguide 5 is connected to an exit side of the arrayed waveguides 4. A plurality of optical output waveguides 6 provided side by side are connected to an exit side of the arrayed waveguides 4.

The arrayed waveguides 4 serve to transmit the light traveling through the first slab waveguide 3. The arrayed waveguides 4 are formed to have different lengths. The lengths of the arrayed waveguides 4 adjacent to each other are different by ($\Delta L$). Note that the optical input waveguides 2 and the optical output waveguides 6 are provided corresponding to the number of signal lights which have wavelength different from each other and which are demultiplexed or multiplexed by, for example, the arrayed waveguide grating. Normally, the arrayed waveguides 4 include a lot of waveguides, for example, 100 waveguides. Referring to FIG. 11, however, simply countable numbers of the optical input waveguides 2, the arrayed waveguides 4 and the optical output waveguides 6 are shown therein for simplicity of illustration.

Since optical fibers (not shown) of, for example, a transmission side are connected to the optical input waveguides 2, the WDM light is introduced. The light entering the first slab waveguide via the optical input waveguides 2 expands due to a diffraction effect thereof and enters the respective arrayed waveguides 4, thus traveling through the arrayed waveguides 4.

The light traveling through the arrayed waveguides 4 arrives at the second slab waveguide 5. Then, these fluxes of light are converged on and outputted to the optical output waveguides 6. However, all the arrayed waveguide 4 have their lengths different from each other. Accordingly, there occur phase shifts between the individual beams of light after traveling through the arrayed waveguides 4. A phase front of the converged flux of light inclines corresponding to a quantity of this phase shift, and a position of the convergence is determined based on an angle of this inclination.

Therefore, the converging positions of the beams of light having different wavelengths become different from each other. The optical output waveguides 6 are provided in those different converging positions. Accordingly, the demultiplexed beams of light having different wavelengths may be outputted from the optical output waveguides 6 provided in the positions different according to the respective wavelengths.

Namely, the arrayed waveguide grating incorporates an optical demultiplexing function of demultiplexing the beams of light having one or more wavelengths from the multiplexed beams of light inputted from the optical input waveguide 2 and having the plurality of wavelengths different from each other, and outputting the thus demultiplexed beams of light from each of the optical output waveguides 6. A center wavelength of the demultiplexed beams of light is proportional to an effective refractive index ($n_c$) of the optical waveguide 4 as well as to the difference ($\Delta L$) in length between the arrayed waveguides 4.

The arrayed waveguide grating exhibits the characteristics described above and is therefore used as a WDM demultiplexer for a WDM transmission. For example, as shown in FIG. 11, when WDM light beams having wavelengths ($\lambda_1, \lambda_2, \lambda_3, \ldots, \lambda_n$) (n is an integer 2 or larger) are inputted from one single line of optical input waveguide 2, the light beams having these wavelengths are expanded through the first slab waveguide 3 and arrive at the arrayed waveguides 4. The light beams travel via the second slab waveguide 5, as described above, converge on the different positions according to the wavelengths and enter the different optical output waveguides 6. The light beams then travel through the corresponding optical output waveguides 6 and are outputted from the exit ends of these optical output waveguides 6.

Then, the optical fibers (not shown) for outputting the light are connected to the exit ends of the optical output waveguides 6. Therefore, the light beams having the above wavelengths are taken out via these optical fibers. Note that when connecting the optical fibers to the optical output waveguides 6 and to the optical input waveguides 2, for instance, an optical fiber array in which the optical fibers are fixedly disposed in a one-dimensional array is prepared and fixed to connection end surface sides of the optical output waveguides 6 and of the optical input waveguides 2. Thus, the optical fibers are connected to the optical output waveguides 6 and to the optical input waveguides 2.

In this arrayed waveguide grating, the light beams outputted from the optical output waveguides 6 exhibit an optical transmitting characteristic (a wavelength characteristic of an intensity of the transmitting light of the arrayed waveguide grating) as shown in FIG. 12. Referring to FIG. 12, an optical transmission becomes smaller as the wavelength shifts from the corresponding optical transmitting center wavelength (e.g., $\lambda_1, \lambda_2, \lambda_3, \ldots, \lambda_n$). It should be noted that the optical transmitting characteristic does not necessarily have one maximal value and might have two or more maximal values in some cases.

Further, the arrayed waveguide grating utilizes the principle of the light reciprocity (reversibility), and therefore has a function of an optical demultiplexer and a function of an optical multiplexer as well. That is, in a direction reverse to the direction in FIG. 11, the light beams having a plurality of diferrent wavelengths enter the optical output waveguides 6 corresponding to the respective wavelengths, then travel through the transmission path in the reverse direction. These light beams are multiplexed in the arrayed waveguides 4 and exit through one single optical input waveguide 2.

In the thus constructed AWG, as explained above, the wavelength resolution of the grating is proportional to the difference ($\Delta L$) in length between the arrayed waveguides 4 constituting the grating. Hence, the WDM light having wavelengths with small differences may be multiplexed and demultiplexed by increasing the difference ($\Delta L$), which could not be realized in the conventional AWG. This design makes it feasible to perform the multiplexing/demultiplexing function for plural beams of signal light which is required for actualizing high-density WDM optical communications, i.e., the function of demultiplexing or multiplexing a plurality of optical signals whose wavelength differences are at most 1 nm.

When manufacturing the AWG described above, for instance, an under cladding layer and a core layer are formed on a silicon substrate by a flame hydrolysis deposition method. Then, sintering and vitrifying thereof are effected. Thereafter, photolithography is carried out through a photomask depicted with a waveguide pattern of the AWG, and the AWG pattern is transferred onto the core layer by a reactive ion etching method. Thereafter, an over cladding layer is formed by using the flame hydrolysis deposition method once again, and sintered and vitrified, thereby manufacturing the AWG.

The AWG is mainly made of a silica-based glass material which has a temperature dependency. Accordingly, the optical transmitting center wavelength of the AWG shifts corresponding to a change in the AWG temperature. This temperature dependency is expressed by the following formula 1:

$$\frac{d\lambda}{dT} = \frac{\lambda}{n_c}\frac{dn_c}{dT} + \lambda\alpha_s \qquad \text{[Formula 1]}$$

where ($\lambda$) is the optical transmitting center wavelength of the light beam outputted from the single optical output waveguide 6, ($n_c$) is an effective refractive index of the core that forms the arrayed waveguide 4, ($\alpha_s$) is a thermal expansion coefficient of the substrate (e.g., silicon substrate) 1, and (T) is a temperature change of the AWG.

Herein, in the typical AWG, the temperature dependency of the optical transmitting center wavelength is obtained from the formula (1). The parameters in this AWG are given such as $dn_c/dT=1\times10^{-5}$ (°C.$^{-1}$), $\alpha_s=3.0\times10^{-6}$ (°C.$^{-1}$), $n_c=1.451$ (a value when the wavelength is 1.55 $\mu$m). These values are used in the formula (1).

Further, although the wavelength ($\lambda$) differs corresponding to each of the optical output waveguides 6, the temperature dependency of each wavelength ($\lambda$) is the same. Then, the AWG prevailing at the present is used in many cases for demultiplexing and multiplexing the WDM light in a wavelength band in the vicinity of a wavelength of 1550 nm, and hence $\lambda=1550$ nm is herein used in the formula (1). The temperature dependency of the optical transmitting center wavelength in the typical AWG is shown by the formula (2):

$$\frac{d\lambda}{dT} = 0.015 \ (\text{nm}/°\text{C.}) \qquad \text{[Formula 2]}$$

Note that a unit of $d\lambda/dT$ is nm/°C. Supposing that the temperature of the AWG changes, for example, by 20° C., the optical transmitting center wavelength of the light beam outputted from the single optical output waveguide 6 shifts to 0.30 (nm). If the temperature changes, for example, 70° C. or higher, the shift amount of the optical transmitting center wavelength becomes 1 (nm) or greater.

The AWG may demultiplex or multiplex the wavelength at a wavelength differences of as small as 1 (nm) or under and thus is applied to the WDM optical communications. It is therefore a problem arises in that the optical transmitting center wavelength, as explained above, shifts by the amount described above due to the change in the environmental temperature.

Under such circumstances, there has hitherto been proposed an arrayed waveguide grating including a temperature control mechanism for keeping a temperature of the AWG constant so that the optical transmitting center wavelength does not shift due to the temperature change. This temperature control mechanism includes, for example, a Peltier device or a heater. The temperature control mechanism control the temperature of the AWG to maintain at a temperature higher than a room temperature.

In the AWG shown in FIG. 11, a Peltier device 30 is provided on the side of a substrate 1 of the AWG, and controls the temperature of the AWG to be constant on the basis of a temperature detected by thermistor 31.

Further, a temperature control mechanism including a heater as a substitute for the Peltier device controls the temperature of the AWG to be a constant high temperature.

When the temperature of the AWG is thus kept constant, neither an expansion/contraction of the substrate 1 nor a change in effective refractive index of the core occurs. It is therefore possible to compensate the temperature dependency of the optical transmitting center wavelength.

The AWG and the optical fiber array are connected generally by use of a bonding agent. If the temperature of the AWG is controlled at room temperature or higher by using the Peltier device or the heater, the bonding agent applied to the connection surface between the AWG and the optical fiber array, for example, expands or softens due to the temperature. Accordingly, if constructed to keep the temperature of the AWG constant by use of the Peltier device, etc., a problem arises in that there might increase a loss of connection between the optical fibers and the optical input waveguides 2 and optical output waveguides 6 of the AWG because of the expanded or softened bonding agent, and that a reliability of the connection between the AWG and the optical fibers might decline.

According to Japanese Patent Application Laid-open No. Hei 11-218639, entitled "Phasing Array Device, i.e., Phaser and Method of Manufacturing the Same" (Claim for Right of Priority Number: 97 13440, Priority Date: Oct. 27, 1997, Country of Claim for Right of Priority: France (FR)), a phasing array device (which is the same as the AWG) includes a first piece and a second piece. The contents of this application are incorporated herein by reference in their entirety. The first piece includes a part of a first slab waveguide and an input waveguides. The second piece includes the other part of the first slab waveguide and other components of the device. The first piece and the second piece are assembled into the complete phasing array device so that a wavelength of the device can be adjusted.

The wavelength of the phasing array device disclosed in Japanese Patent Application Laid-open No. Hei 11-218639 is adjusted with respect to an initial shift of the optical transmitting center wavelength due to a scatter in manufacturing the phasing array device. After the adjustments of the plurality of pieces have been finished, the plurality of pieces are fixedly bonded to the support member with a bonding agent, etc.

SUMMARY OF THE INVENTION

According to an aspect of the invention, an arrayed waveguide grating includes at least one first optical waveguide, a first slab waveguide, a plurality of arrayed waveguides, a second slab waveguide, and a plurality of second optical waveguides. The plurality of arrayed waveguides are connected to the at least one first optical waveguide via the first slab waveguide. Each of the plurality of arrayed waveguides has a different length. The plurality of second optical waveguides are connected to the plurality of arrayed waveguides via the second slab waveguide. At least one of the first and second slab waveguides is partitioned to first and second segments at a partition surface intersecting a path of light which travels through the arrayed waveguide grating. At least one of the first and second segments is configured to be slid along the partition surface to compensate an optical transmitting center wavelength of the light according to a temperature of the arrayed waveguide grating.

According to another aspect of the invention, a method for compensating an optical transmitting center wavelength of light which travels through an arrayed waveguide grating includes partitioning at least one of first and second slab waveguides to first and second segments at a partition surface intersecting a path of the light, and sliding at least one of the first and second segments along the partition surface to compensate an optical transmitting center wavelength of the light according to a temperature of the arrayed waveguide grating.

According to yet another aspect of the invention, a wavelength division multiplexing optical communication system includes an arrayed waveguide grating through which light travels. The arrayed waveguide grating includes at least one first optical waveguide, a first slab waveguide, a plurality of arrayed waveguides, a second slab waveguide, and a plurality of second optical waveguides. The plurality of arrayed waveguides are connected to the at least one first optical waveguide via the first slab waveguide. Each of the plurality of arrayed waveguides has a different length. The plurality of second optical waveguides are connected to the plurality of arrayed waveguides via the second slab waveguide. At least one of the first and second slab waveguides is partitioned to first and second segments at a partition surface intersecting a path of light which travels through the arrayed waveguide grating. At least one of the first and second segments is configured to be slid along the partition surface to compensate an optical transmitting center wavelength of the light according to a temperature of the arrayed waveguide grating.

According to yet another aspect of the invention, an arrayed waveguide grating includes a first slab waveguide, a plurality of arrayed waveguides, and a second slab waveguide. The plurality of arrayed waveguides connects the first slab waveguide and the second slab waveguide. Each of the plurality of arrayed waveguides has a different length. At least one of the first and second slab waveguides is partitioned to first and second segments at a partition surface intersecting a path of light which travels through the arrayed waveguide grating. At least one of the first and second segments is configured to be slid along the partition surface to compensate an optical transmitting center wavelength of the light according to a temperature of the arrayed waveguide grating.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
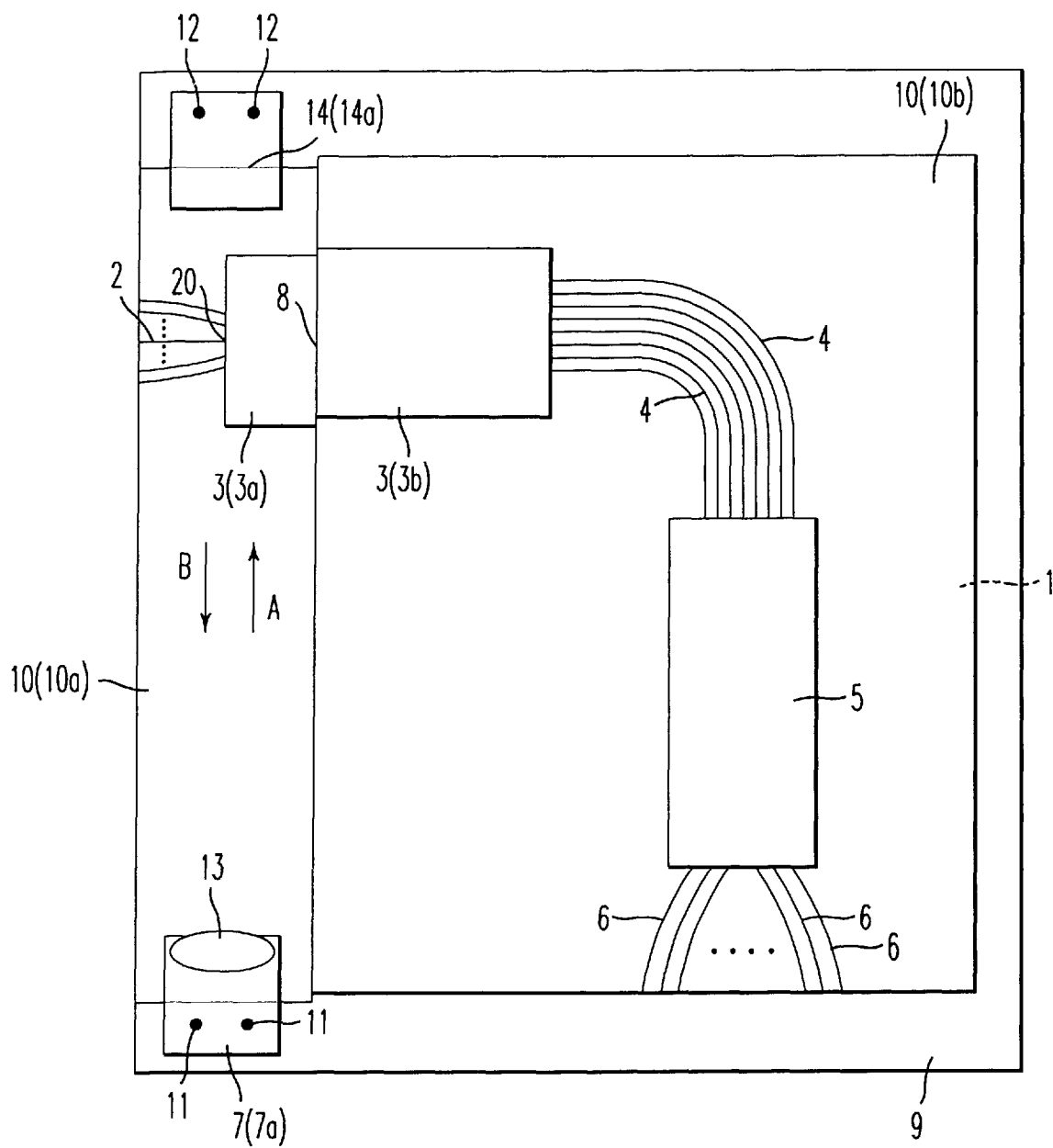
FIG. 1 is a plan view showing a construction of principal components of an arrayed waveguide grating according to an embodiment of the present invention.
Figure 1:
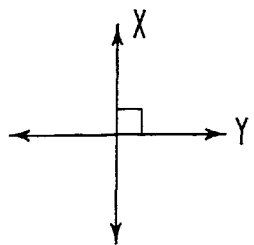

The preferred embodiments will now be described with reference to the accompanying drawings, wherein like reference numerals designate corresponding or identical elements throughout the various drawings.

FIG. 1 is a plan view schematically showing an arrayed waveguide grating according to an embodiment of the present invention. Referring to FIG. 1, the arrayed waveguide grating in this embodiment includes a core-based waveguide pattern that is formed on the substrate 1. As shown in FIG. 1, the waveguide pattern on the substrate 1 is provided on a waveguide forming portion (area) 10 (10a, 10b). The waveguides include cores and claddings composed of silica-based glass or the like. The waveguides are provided on a substrate 1 which is made of silicon or the like.

The arrayed waveguide grating includes a plurality of optical input waveguides (first optical waveguides) 2, a first slab waveguide 3, a plurality of arrayed waveguides 4, a second slab waveguide 5 and a plurality of optical output waveguides (second optical waveguides) 6. In this embodiment, for example, light is input from one of the plurality of optical input waveguides. The arrayed waveguide grating may include a single line of an optical input waveguide 2. The plurality of arrayed waveguides 4 are provided side by side to have predetermined waveguide spaces among the arrayed waveguides 4. Similarly, the optical output waveguides 6 are provided side by side to have predetermined waveguide spaces among the optical output waveguides 6. In this arrayed waveguide grating, the first slab waveguide 3 is partitioned at a partition surface 8 intersecting a path of the light traveling through the first slab waveguide 3.

Further, corresponding to the partition of the first slab waveguide 3, the substrate 1 and the waveguide forming area 10 are likewise partitioned into first and second segments, respectively. The waveguide forming area segment (10b) includes a slab waveguide segment (3b), the arrayed waveguide 4, the second slab waveguide 5 and the optical output waveguide 6. The waveguide forming area segment (10b) and the substrate 1 which is disposed under the waveguide forming area segment (10b) are fixed to a base 9. The base 9 is made of a material which has a low thermal expansion coefficient. For example, the base 9 is made of a silica glass, an Invar, or the like.

On the other hand, the waveguide forming area segment (10a) includes a slab waveguide segment (3a). The waveguide forming area segment (10a) and the substrate 1 which is disposed under the waveguide forming area segment (10a) are provided to be slidable in directions indicated by arrows (A and B) in FIG. 1 along the surface of the base 9. One end of the waveguide forming area segment (10a) is fixed to a high thermal expansion coefficient member 7 which has a high thermal expansion coefficient via a fixing material 13 such as a bonding agent or the like. The other end of the waveguide forming area segment (10a) is slidably supported by a securing member 14.

In the present embodiment, the first slab waveguide 3 is partitioned into the slab wave guide segments (3a and 3b) at the partition surface 8 which intersects the path of the light traveling through the first slab waveguide 3. The optical transmitting center wavelength is shifted by sliding the slab waveguide segment (3a) along the partition surface 8. The slab waveguide segment (3a) is slid by, for example, a slide mechanism.

The slide mechanism slides the slab waveguide segment (3a) along the partition surface 8 in a direction to reduce a change of each optical transmitting center wavelength of the arrayed waveguide grating based on a temperature change.

In this embodiment, the slide mechanism includes the high thermal coefficient member (a moving member) 7, the base 9 and the securing member 14.

Figure 2:
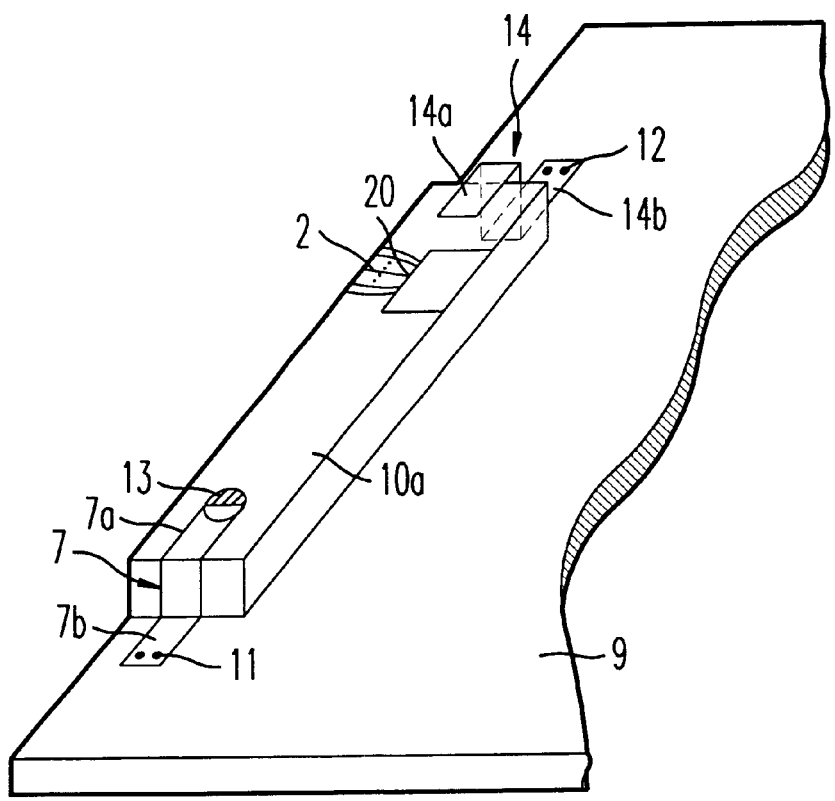
FIG.2 is a perspective view of a waveguide forming area segment attached to a base.

Referring to FIG. 2, the high thermal expansion coefficient member 7 is a step-shaped member including an upper plate (7a) and a lower plate (7b). The upper plate (7a) is provided along and fixed to the upper surface of the waveguide forming area segment (10a). The lower plate (7b) is provided along the surface of the base 9 and fixed to the base 9 with fixing parts 11. The high thermal expansion coefficient member 7 is made of a substance that contracts at a thermal expansion coefficient corresponding to a slide amount of the slab waveguide segment (3a) which corresponds to the shift of the optical transmitting center wavelength of the arrayed waveguide grating. The high thermal expansion coefficient member 7 is composed of, e.g., aluminum (Al) of which a thermal expansion coefficient is $2.5 \times 10^{-5}$ (1/K).

Figure 3:
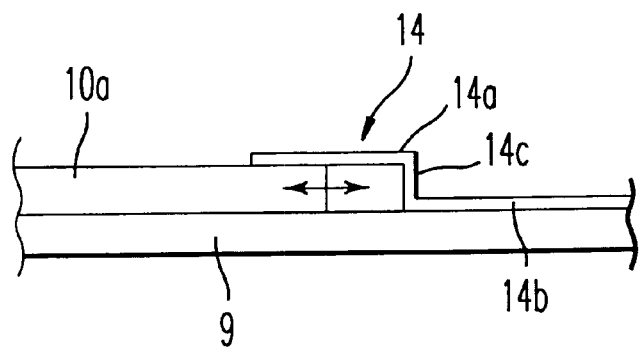
FIG. 3 is a side view of FIG. 2.

Referring to FIGS. 2 and 3, the securing member 14 is also a step-shaped member having an upper plate (14a) and a lower plate (14b). The upper plate (14a) is provided along and slidably contact the upper surface of the waveguide forming area segment (10a). The lower plate (14b) is fixed to the base 9 with fixing parts 12. An inner wall of the upper plate (14a) of the securing member 14 is brought into contact with the upper surface of the waveguide forming area segment (10a). Accordingly, the waveguide forming area segment (10a) does not displace upwards (a Z-axis direction perpendicular to an X-Y plane in FIG. 1) with respect to the base 9 when the waveguide forming area segment (10a) slides. Further, as shown in FIG. 3, the right end of the waveguide forming area segment (10a) is apart from a step portion (14c) of the securing member 14. Accordingly, the waveguide forming area segment (10a) may slide with no obstacle.

The present inventors put a focus on a linear dispersion characteristic of the AWG in order to restrain the temperature dependency of the AWG. In the AWG, the beams of light entering one of the optical input waveguides diffract in the first slab waveguide 3 (the input-side slab waveguide) and excite the arrayed waveguides 4. The lengths of the arrayed waveguides adjacent to each other are, as described above, different by AL from each other. Accordingly, the beams of light traveling through the arrayed waveguides 4 satisfy the formula (3), and converge on an output end of the second slab waveguide 5 (the output-side slab waveguide).

$$n_s d \sin \phi + n_c \Delta L = m\lambda \qquad \text{[Formula 3]}$$

where ($n_s$) is an effective refractive index of the first and second slab waveguides, ($n_c$) is an effective refractive index of the arrayed waveguides, ($\phi$) is a diffraction angle, (m) is a diffraction order, (d) is a distance between the arrayed waveguides adjacent to each other, and ($\lambda$) is, as explained above, the optical transmitting center wavelength of the light outputted from each optical output waveguide.

It is supposed that the optical transmitting center wavelength is ($\lambda_0$) when the diffraction angle ($\phi$) is equal to 0. The optical transmitting center wavelength ($\lambda_0$) is given by the following formula (4). Note that the optical transmitting center wavelength ($\lambda_0$) is generally called as a center wavelength of the AWG.

$$\lambda_0 = \frac{n_c \Delta L}{m} \qquad \text{[Formula 4]}$$

Referring now to FIG. 3, supposing that a point (O) is set as a converging position of the AWG when the diffraction angle (φ) is equal to 0, a converging position (a position at the output end of the second slab waveguide 5) of the light having the diffraction angle (φ) of (φp) becomes, for example, a point (P) which deviates from the point (O) in the X-direction. When it is supposed that the distance between the points (O and P) in the X-direction is (x), the following formula (5) shows the relationship between the distance (x) and the wavelength (λ).

$$\frac{dx}{d\lambda} = \frac{L_f \Delta L}{n_s d\lambda_0} n_g \qquad \text{[Formula 5]}$$

where ($L_f$) is a focal length of the second slab waveguide, and ($n_g$) is a group refractive index of the arrayed waveguide. The group refractive index ($n_g$) of the arrayed waveguide is given in relation to the effective refractive index ($n_c$) by the following formula (6):

$$n_g = n_c - \lambda_0 \frac{dn_c}{d\lambda} \qquad \text{[Formula 6]}$$

The formula (5) means that it is possible to take out the light beams whose wavelengths are different by (dλ) by providing the input end of the optical output waveguides at a position apart from the focal point (O) of the second slab waveguide in the X-direction by the distance (dx).

Further, the relationship given in the formula (5) similarly applies to the first slab waveguide 3. Namely, for instance, it is supposed that a point (O') be a center of focus of the first slab waveguide 3 and that a point (P') be a point which is shifted from the point (O') in the X-direction by a distance (dx'). When the light inputs from the point (P'), an output wavelength shifts by (dλ'). This relationship is expressed by the formula (7):

$$\frac{dx'}{d\lambda'} = \frac{L'_f \Delta L}{n_s d\lambda_0} n_g \qquad \text{[Formula 7]}$$

where ($L_f'$) is a focal length of the first slab waveguide. The formula (7) means that it is possible to take out the light beams whose wavelengths are different by (dλ') by providing the output end of the optical input waveguides at a position apart from the focal point (O') of the first slab waveguide in the X-direction by the distance (dx').

Accordingly, when the optical transmitting center wavelength of the light which is output from the optical output waveguide of the AWG shifts by (Δλ) due to a change in the environmental temperature, the position of the output end of the optical input waveguide is shifted by a distance (dx') in the X-direction so that (dλ') is equal to (Δλ). Therefore, the light beams whose wavelengths do not shift can be taken out from, for example, the optical output waveguide formed at the focal point (O). Similar operations occur in other optical output waveguides. Therefore, the change (Δλ) in the light transmitting center wavelength may be compensated.

At least one of the first and second slab waveguides is partitioned at the surface which intersects the path of the light traveling through the slab waveguide. According to the embodiment of the present invention, the first slab waveguide 3 is partitioned at the partition surface 8 which intersects the path of the light traveling through the first slab waveguide 3. Therefore, when the slide mechanism slides the first slab waveguide segment (3a) together with the optical input waveguides 2, each optical transmitting center wavelength may shift.

Further, when the slide mechanism slides the slab waveguide segment and the optical input waveguides along the partition surface in a direction so as to reduce the change in each light transmitting center wavelength according to the temperature change so that the wavelength shift (Δλ) according to the temperature change is equal to (dλ), the shift in the optical transmitting center wavelength may be compensated.

Describing more precisely, the focal length (Lf) of the light traveling through within the first slab waveguide 3 from the output end of the optical input waveguide 2 to the input end of the arrayed waveguides 4 slightly changes by shifting the position of the output end of the optical input waveguides. However, a focal length of the first slab waveguide presently used in the AWG is on the order of several millimeters (mm). On the other hand, a moving distance of the output end of the optical input waveguides which moves for compensating the optical transmitting center wavelength of the AWG is on the order of several μm–several tens of μm. This moving distance is significantly smaller than the focal length of the first slab waveguide.

Accordingly, the change in the focal length may be substantially ignored. Therefore, as explained above, the shift of the optical transmitting center wavelength may be substantially obviated by sliding the slab waveguide segment and the optical input waveguides along the partition surface in such a direction as to decrease the temperature depending shift of the optical transmitting center wavelength in the AWG.

Next, a relationship between a change in the temperature and a compensation amount of the position of the optical input waveguide. The temperature dependency (the shift amount of the optical transmitting center wavelength corresponding to the temperature change) of the optical transmitting center wavelength is expressed by the formula (2). Accordingly, the shift amount (Δλ) of the optical transmitting center wavelength is expressed by the formula (8) using a temperature change (T).

$$\Delta\lambda = \frac{d\lambda}{dT} T \qquad \text{[Formula 8]}$$

According to the formulae (7) and (8), the relationship between the temperature change (T) and a compensation amount (dx') of the position of the input waveguide is shown by the formula (9).

$$dx' = \frac{L'_f \Delta L}{n_s d\lambda_0} n_g \frac{d\lambda}{dT} T \qquad \text{[Formula 9]}$$

Therefore, according to the embodiment of the present invention, the slide mechanism slides the slab waveguide segment and the optical input waveguides along the partition surface by the position compensation amount (dx') given by the formula (9). Thus, the shift of the optical transmitting center wavelength may be compensated.

Further, as discussed above, the AWG utilizes the light reciprocity. The second slab waveguide may be partitioned, and at least one of the slab waveguide segments is slid along the partition surface by the slide mechanism in such a direction as to reduce the temperature depending shift of the optical transmitting center wavelength. Similarly, according to this construction, the temperature depending shift of the optical transmitting center wavelength may be compensated.

Moreover, according to the embodiment of the present invention, even when the Peltier device and the heater are not used, the shift of the light transmitting center wavelength due to the change in environmental temperature of the AWG may be restrained. Therefore, electric power is not always required to be supplied to the device while electric power is required when the arrayed waveguide grating is provided with a temperature controlling mechanism, for example, the Peltier device, the heater or the like. Further, a temperature compensation error due to an error in assembling the parts may be prevented. Furthermore, an increase of connection loss between the AWG and the optical fibers because of keeping the arrayed waveguide grating in a temperature higher than a room temperature may be prevented.

Parameters in the waveguide pattern in this embodiment are given as described below. A focal length ($L_f'$) of the first slab waveguide 3 is equal to a focal length ($L_f$) of the second slab waveguide 5. The focal lengths ($L_f'$ and $L_f$) are 9 mm (9000 $\mu$m). Further, both of an effective refractive indexes of the first slab waveguide 3 and the second slab waveguide 5 are represented by ($n_s$). The value of ($n_s$) is equal to 1.453 with respect to the light having a wavelength of 1.55 $\mu$m at 25° C. Moreover, an optical-path difference ($\Delta L$) between the arrayed waveguides 4 is 65.2 $\mu$m. A distance between the arrayed waveguides 4 adjacent to each other is 15 $\mu$m, and a diffraction order (m) is 61. An effective refractive index ($n_c$) of the arrayed waveguide 4 is 1.451 with respect to the light having a wavelength of 1.55 $\mu$m, and a group refractive index of the arrayed waveguide is 1.475 with respect to the light having a wavelength of 1.55 $\mu$m.

Accordingly, in the arrayed waveguide grating in this embodiment, the light transmitting center wavelength ($\lambda_0$) when a diffraction angle ($\phi$) is equal to 0 is 1550.9 nm according to the formula (4) given above.

The present inventors put a focus on a linear dispersion characteristic of the arrayed waveguide grating in order to restrain the temperature dependency of the arrayed waveguide grating. According to the formulae (7) and (8), the relationship between the temperature change (T) and a compensation amount (dx') of the position of the input waveguide is shown by the formula (9).

In the present embodiment, the relationship between the temperature change (T) of the arrayed waveguide grating and the position compensation amount (dx') of the optical input waveguide 2 is obtained based on the parameters of the waveguide pattern of the arrayed waveguide grating and the formula (9). This relationship is given by the following formula (10):

$$dx'=0.38291T(\mu m) \quad \text{[Formula 10]}$$

Hence, in this embodiment, when the temperature change (T) is 10° C., the position of the output end of one of the optical input waveguides 2 is moved by approximately 3.83 $\mu$m in the X-direction. Therefore, a deviation of the center wavelength due to the temperature change may be corrected.

In the present embodiment, the slide amount of the slab waveguide segment (3a) is set so that the position of the output end 20 of the optical input waveguide 2 is shifted approximately 3.83 $\mu$m in the direction indicated by the arrow (A) when the temperature rises by 10° C., and the position of the output end 20 of the optical input waveguide 2 is shifted approximately 3.83 $\mu$m in the arrow (B) direction when the temperature lowers by 10° C. Size, shape and the like of the high thermal expansion coefficient member 7 are determined to obtain the necessary slide amount. The slide mechanism slides the slab waveguide segment (3a) in such a direction as to reduce the temperature depending shift of each optical transmitting central wavelength.

When manufacturing the arrayed waveguide grating in the present embodiment, the present inventors assembled a module by applying a temperature compensation package of a fiber grating. Namely, the first slab waveguide 3 is cut by use of a dicing saw, and a matching grease which has a refractive index matching with that of the silica-based glass is applied to the cut surface 8 in order to prevent reflection on the cut surface 8. Further, a thermosetting bonding agent is used as the bonding agent 13 for bonding the high thermal expansion coefficient member 7 to the waveguide forming area segment (10a). The bonding agent 13 was hardened at 100° C.

In the present embodiment of the invention, the first slab waveguide 3 is partitioned into the first and second slab waveguide segments (3a and 3b) at the partition surface 8 which intersects the path of the light traveling through the first slab waveguide 3. When the temperature of the arrayed waveguide grating changes, the slide mechanism slides the slab waveguide segment (3a) along the partition surface 8 in such a direction (indicated by the arrow A or B) as to reduce the temperature depending shift of each optical transmitting ventral wavelength of the arrayed waveguide grating.

The slide amount described above corresponds to the position compensation amount (dx') obtained by the formula (10). The slab waveguide segment (3a) and the optical input waveguide 2 slide.

Therefore, according to the present embodiment of the invention, even when the temperature of the arrayed waveguide grating changes, the deviation of the light transmitting center wavelength corresponding to the temperature change may be compensated. The so-called temperature non-depending arrayed waveguide grating that does not depend on the environmental temperature may be provided.

Figure 4:
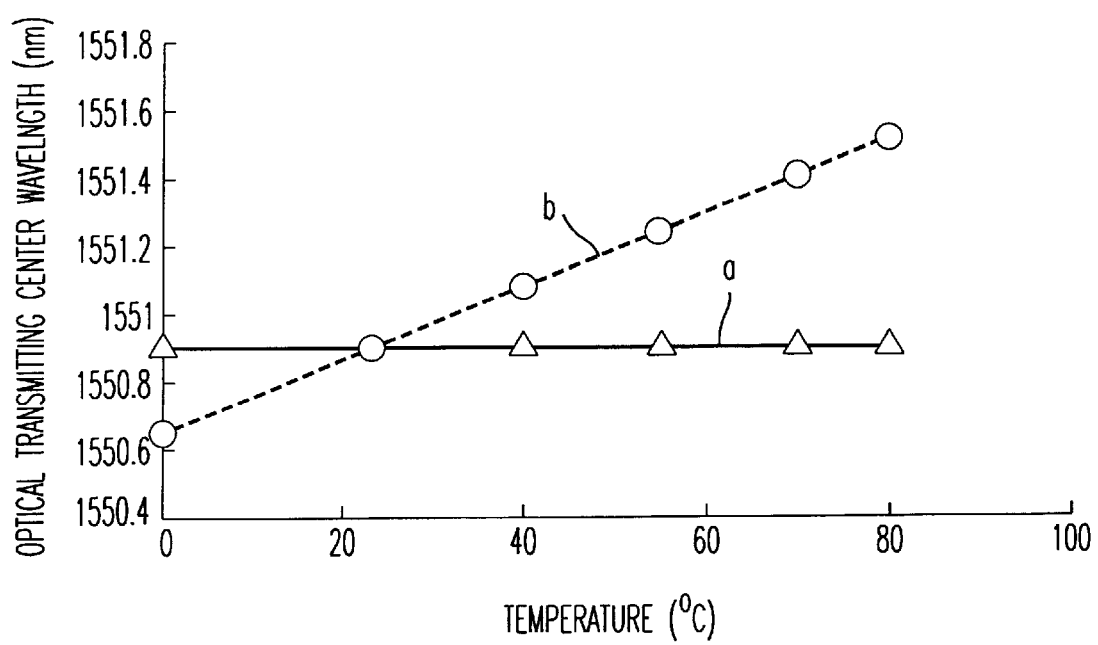
FIG. 4 is a graph showing a comparison between a temperature dependency of an optical transmitting center wavelength in the AWG according to the embodiment of the present invention and the temperature dependency of the optical transmitting center wavelength in a conventional AWG.
Figure 5:
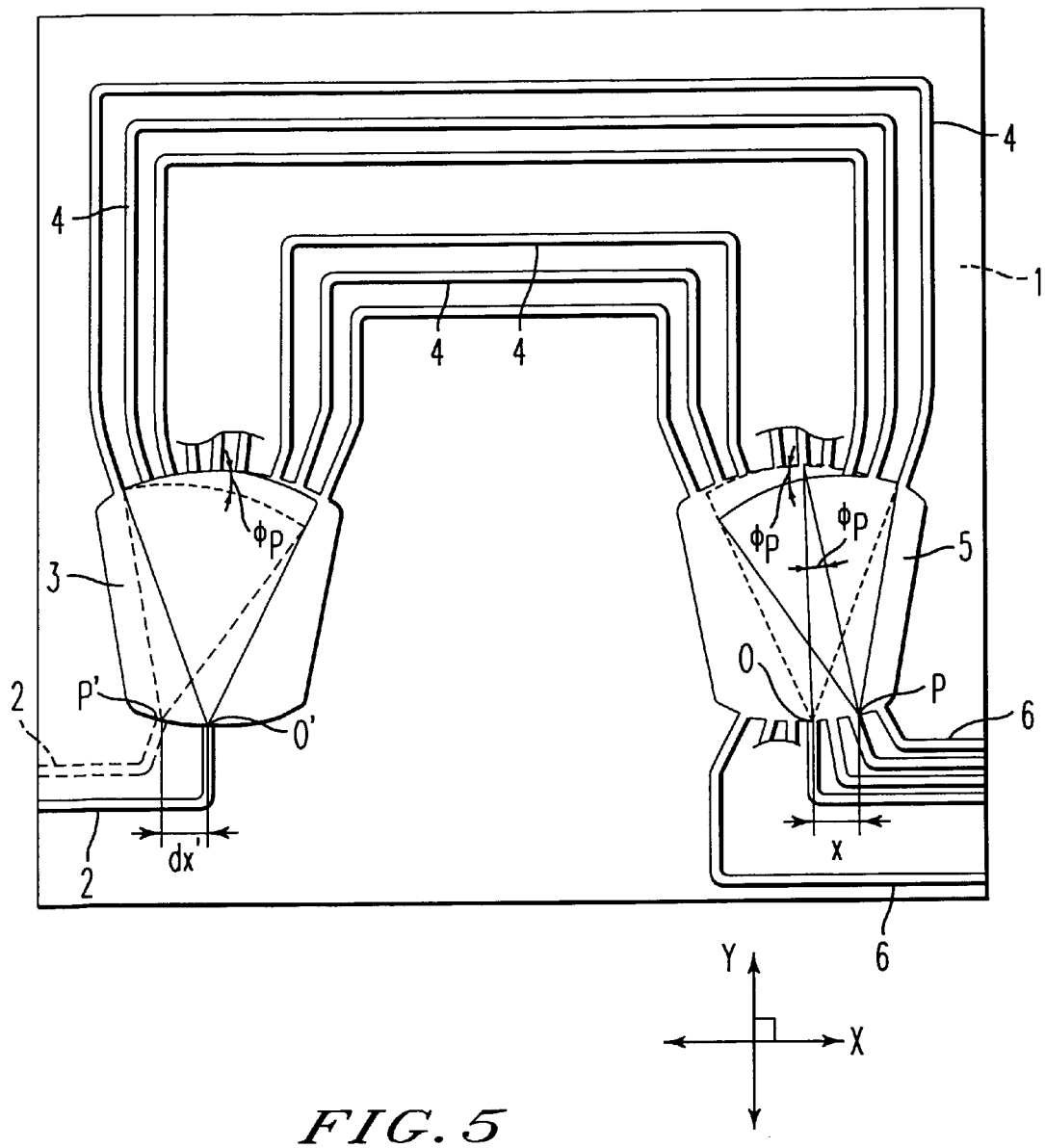
FIG. 5 is an explanatory view showing a relationship between a shift of the optical transmitting center wavelength and positions of optical input and output waveguides in the AWG.

The present inventors actually measured a change in the light transmitting center wavelength when the environmental temperature changes 0° C. to 80° C. FIG. 4 illustrates the measured result. Referring to FIG. 4, a line (a) shows the change of the present embodiment of the invention. In the present embodiment, the shift amount of the optical transmitting center wavelength is on the order of 0.01 nm or smaller. Even when the temperature changes 0° C. to 80° C., the light transmitting center wavelength of the present embodiment does not substantially change.

Referring to FIG. 4, a line (b) shows the change in the light transmitting center wavelength of the conventional arrayed waveguide grating. The conventional arrayed waveguide grating includes the first slab waveguide 3 which is not divided, and the same parameters as those of the waveguide pattern of the arrayed waveguide grating according to the present embodiment are set. As obvious from a comparison between the characteristic line (a) and the characteristic line (b), the arrayed waveguide grating in the present embodiment may compensate the temperature dependency of the optical transmitting center wavelength. The arrayed waveguide grating according to the present embodiment of the invention may be suitably utilized, for example, in the WDM optical communications and so on.

Further, temperature dependency of the light transmitting center wave length d$\lambda$/dT of a conventional arrayed waveguide grating corresponds to a gradient of a line (b). Although temperature dependency of the light transmitting center wave length d$\lambda$/dT is 0.11 nm/°C. as an actually measured value of the gradient of a line (b), 0.15 nm/°C., which is a theoretically calculated value of dλ/dT, is used in the design for the embodiment of the present invention instead of actually measured value of dλ/dT. Shown as a gradient of a line (a) in FIG. 4, temperature dependency of the light transmitting center wavelength disappeared in the present embodiment of the invention regardless of such circumstances.

Further, according to the present embodiment of the invention, the slide mechanism includes the high thermal expansion coefficient member 7, the base 9 and the securing member 14. One end of the waveguide forming area segment (10a) and one end of the substrate 1 which is disposed under the waveguide forming area segment (10a) are fixed via the high thermal expansion coefficient member 7 to the base 9. The other end of the waveguide forming area segment (10a) and the other end of the substrate 1 are secured to the securing member 14. This simple construction of the slide mechanism may simplify the construction of the arrayed waveguide grating.

Moreover, according to the present embodiment of the invention, the waveguide forming area segment (10a) and the substrate 1 which is disposed under the waveguide forming area segment (10a) are slidably mounted to the base 9, while the waveguide forming area segment (10b) and the substrate which is disposed under the waveguide forming area segment (10b) are fixed to the base 9. The arrayed waveguide grating may be therefore easily manufactured.

Further, according to the present embodiment of the invention, neither the Peltier device nor the heater is required. Accordingly, electric power is not always required to be supplied. Further, a temperature compensation error due to an error in assembling the parts does not occur. Furthermore, the connection loss between the arrayed waveguide grating and the optical fibers due to relatively high temperature around the arrayed waveguide grating does not increase.

Accordingly, according to the present embodiment of the invention, the temperature dependency of the optical transmitting center wavelength may be compensated and a reliability of the connection with the optical fibers may increase. Further, the manufacturing costs may reduce.

It is to be noted that the present invention is not limited to the embodiment discussed above and may take a variety of modes. For example, although the aluminum (Al) plate is used as the high thermal expansion coefficient member 7, this member 7 is not necessarily composed of Al and may also be formed of other materials which have high thermal expansion coefficients.

Figure 6:
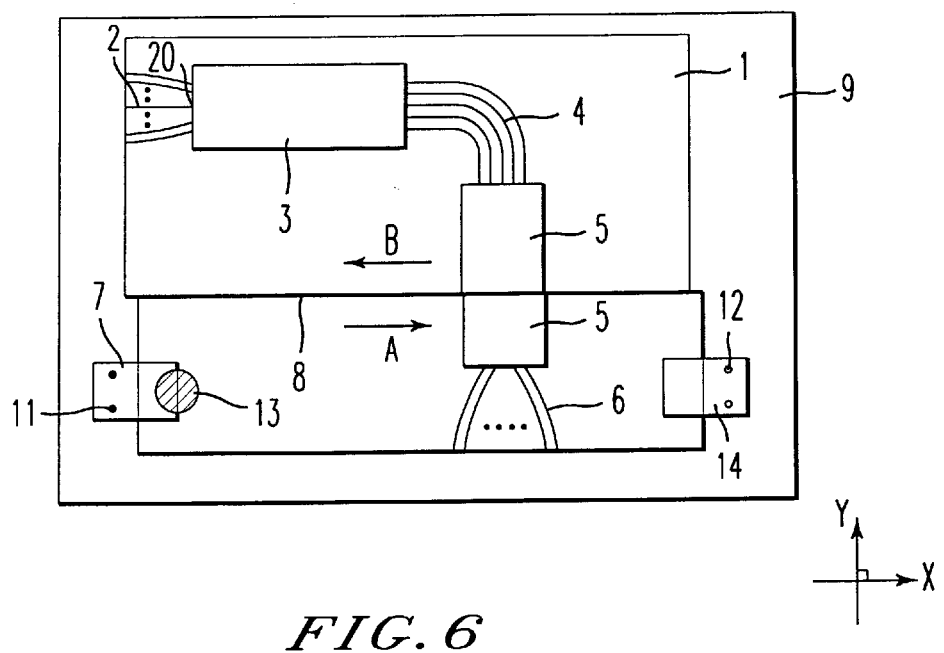
FIG. 6 is a plan view showing a construction of principal components of an arrayed waveguide grating according to another embodiment of the present invention.

Further, in the embodiment discussed above, the first slab waveguide 3 is partitioned. However, referring to FIG. 6, because the arrayed waveguide grating is formed by utilizing the light reciprocity, the second slab waveguide 5 may be partitioned into first and second segments and at least one of first and second segments may be slid along the partition surface 8 by the slide mechanism in such a direction as to decrease the shift of the optical transmitting center wavelength due to the temperature change. According to this construction, effects similar to the effects which is obtained in the embodiment discussed above may be obtained.

Figure 7:
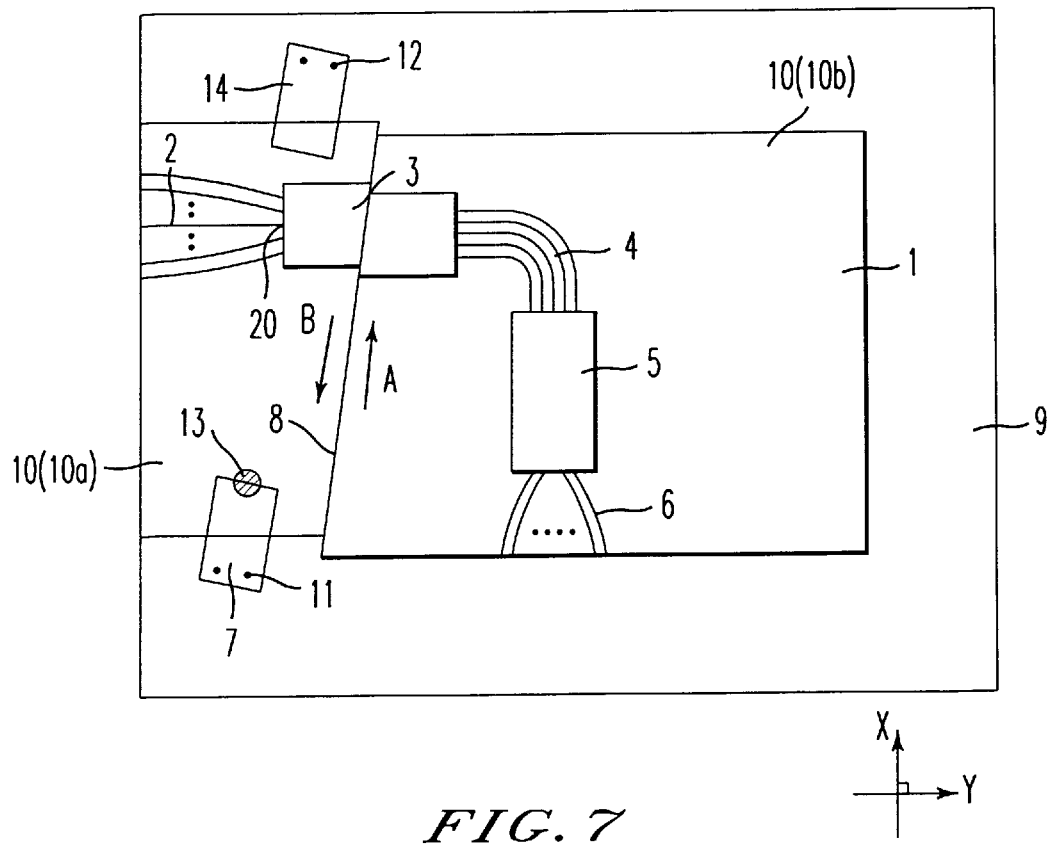
FIG. 7 is a plan view showing a construction of principal components of an arrayed waveguide grating according to yet another embodiment of the present invention.

Moreover, the partition surface 8 of the first slab waveguide 3 or the second slab waveguide 5 is not necessarily the surface substantially parallel to the X-axis (substantially perpendicular to the path of the light) as in the embodiment discussed above. For example, referring to FIG. 7, the partition surface 8 of the first slab waveguide 3 may be a surface oblique to the X-axis or oblique to the path of the light.

Further, the arrayed waveguide grating utilizes the principle of the light reciprocity (reversibility), and therefore has a function of an optical demultiplexer and a function of an optical multiplexer as well. In FIG. 1, for example, the light is input from one of the optical input waveguides 2. In a direction reverse to the direction in FIG. 1, the light beams having a plurality of diferrent wavelengths enter the optical output waveguides 6 corresponding to the respective wavelengths, then travel through the transmission path in the reverse direction. These light beams are multiplexed in the arrayed waveguides 4 and exit through one of the optical input waveguides 2.

It is desirable that the slide mechanism has, as described in the present embodiment, the function of sliding in the direction in which to reduce the shift of each optical transmitting center wavelength of the AWG due to the temperature change. Accordingly, the temperature dependency of the optical transmitting center wavelength may be compensated and the AWG which is suitable to be used in the WDM optical communications and so forth may be obtained.

Moreover, the parameters in details such as the effective refractive indexes, the sizes and the numbers of the respective waveguides 2, 3, 4, 5 and 6 constituting the arrayed waveguide grating according to the present embodiment of the invention are not particularly limited but may be properly set.

Figure 8:
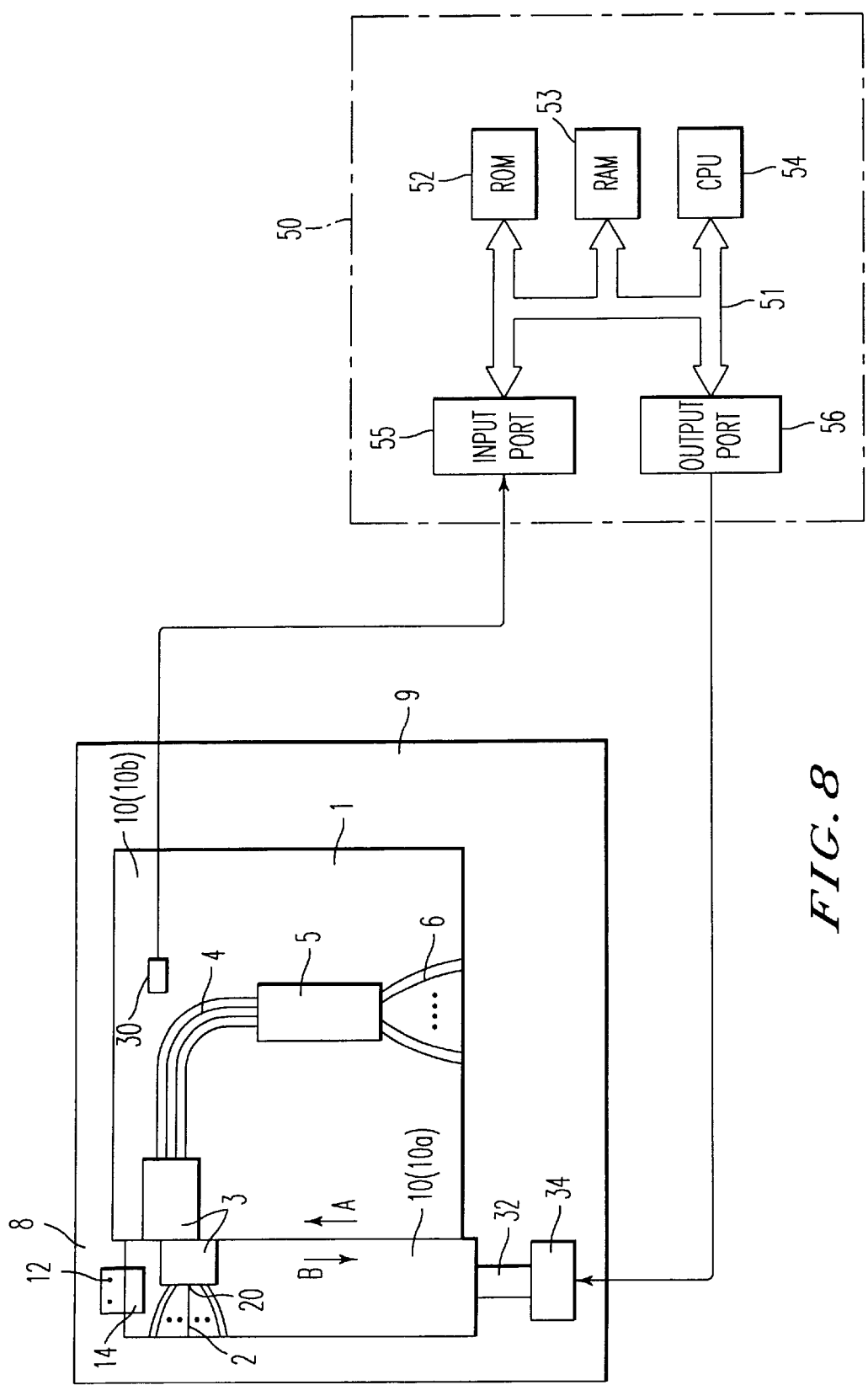
FIG. 8 is a plan view showing a construction of principal components of an arrayed waveguide grating according to the other embodiment of the present invention.

FIG. 8 is a plan view schematically showing an arrayed waveguide grating according to the other embodiment of the present invention. In the previous embodiments described above, the slide mechanism for sliding the slab waveguide segment (3a) along the partition surface 8 is constructed using the high thermal expansion coefficient member 7. The slide mechanism may not, however, be restricted to the above construction and may embrace proper settings. Namely, the slide mechanism may shift the light transmitting center wavelength of the AWG by sliding along the partition surface 8 at least one of the slab waveguide segments into which at least one of the first and second slab waveguides (3 and 5) is partitioned at the partition surface 8. Referring to FIG. 8, a temperature detecting sensor 30 is provided on the substrate 1 to detect the temperature of the substrate 1 that is a part of the arrayed waveguide grating.

A piezo electric crystal 32 is connected to one end of the waveguide forming area segment (10a) such that the waveguide forming area segment (10a) moves corresponding to the movement of the piezo electric crystal 32. For example, the piezo electric crystal 32 is fixed to one end of the waveguide forming area segment (10a). As similar to the previous embodiments, the other end of the waveguide forming area segment (10a) is slidably supported by the securing member 14.

An electronic control unit 50 is constructed as a digital computer and includes a ROM (read only memory) 52, a RAM (random access memory) 53, a CPU (microprocessor) 54, an input port 55, and an output port 56. The ROM 52, the RAM 53, the CPU 54, the input port 55, and the output port 56 are interconnected via a bidirectional bus 51. The temperature detecting sensor 30 is connected to the input port 55. The piezo electric crystal 32 is connected to the output port 56 via a drive circuit 34.

Figure 9:
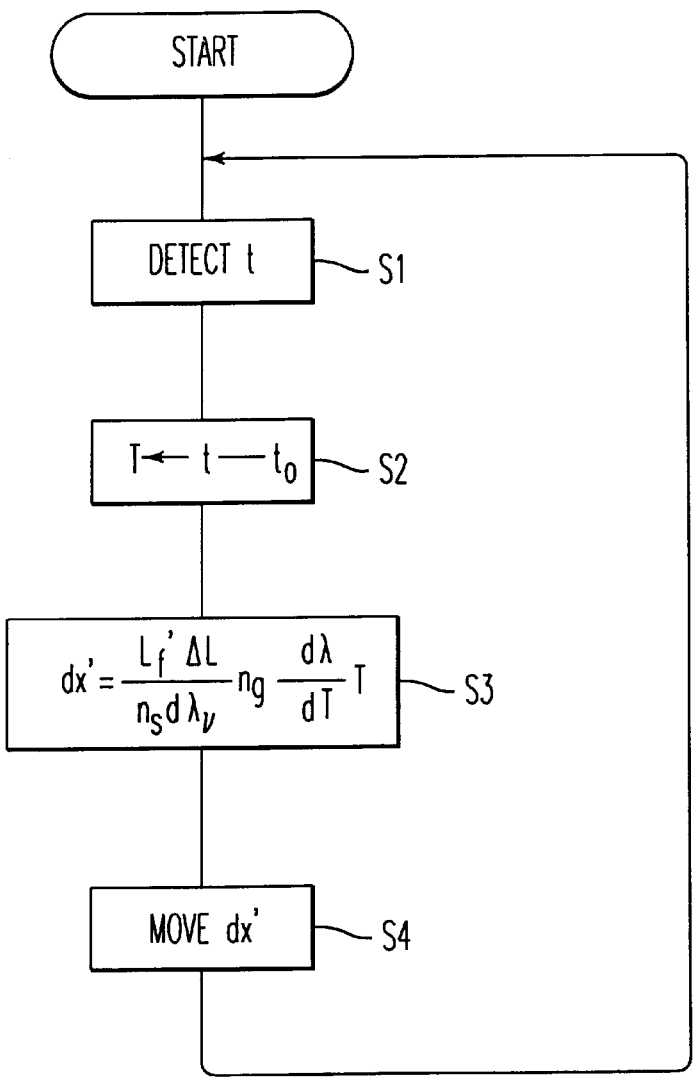
FIG. 9 is a flow chart for controlling the movement of the waveguide forming area segment in the embodiment as shown in FIG. 8.

FIG. 9 is a flow chart for controlling the movement of the waveguide forming area segment (10a). Referring to FIG. 9, at step (S1), the temperature detecting sensor 30 detects the temperature (t) of the substrate 1. At step (S2), temperature change (T) is calculated by subtracting a predetermined reference temperature ($t_0$) from detected temperature (t). The reference temperature ($t_0$) is a constant temperature, for example, 45° C. At step (S3), the compensation amount (dx') of the position of the input waveguide is calculated based on the formula (9).

At step (S3), the compensation amount (dx') of the position of the input waveguide is calculated based on the formula (9).

$$dx' = \frac{L'_f \Delta L}{n_s d\lambda_0} n_g \frac{d\lambda}{dT} T$$

At step (S4), the electronic control unit 50 outputs the signal to the piezo electric crystal 32 to move the waveguide forming area segment (10a) by the compensation amount (dx'). Then, the routine returns to step (S1).

According to this embodiment, effects similar to the effects which is obtained in the embodiments discussed above may be obtained.

Figure 10:
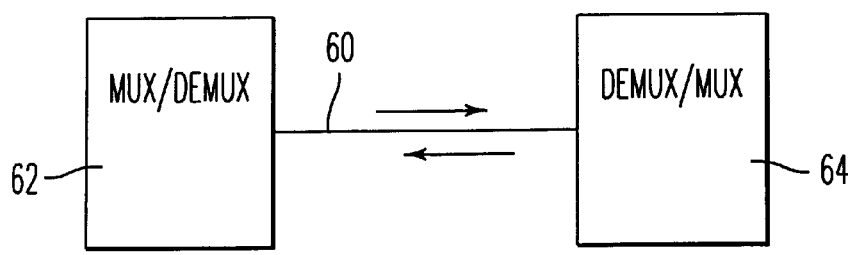
FIG. 10 is a block diagram showing a wavelength division multiplexing optical communication system.
Figure 11:
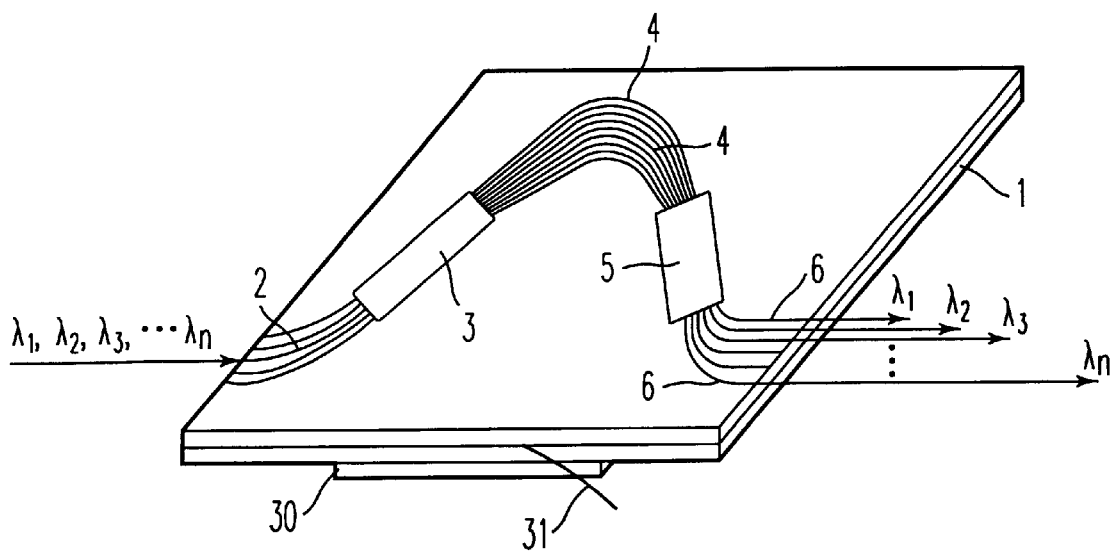
FIG. 11 is a schematic perspective view showing a conventional AWG including a Peltier device.
Figure 12:
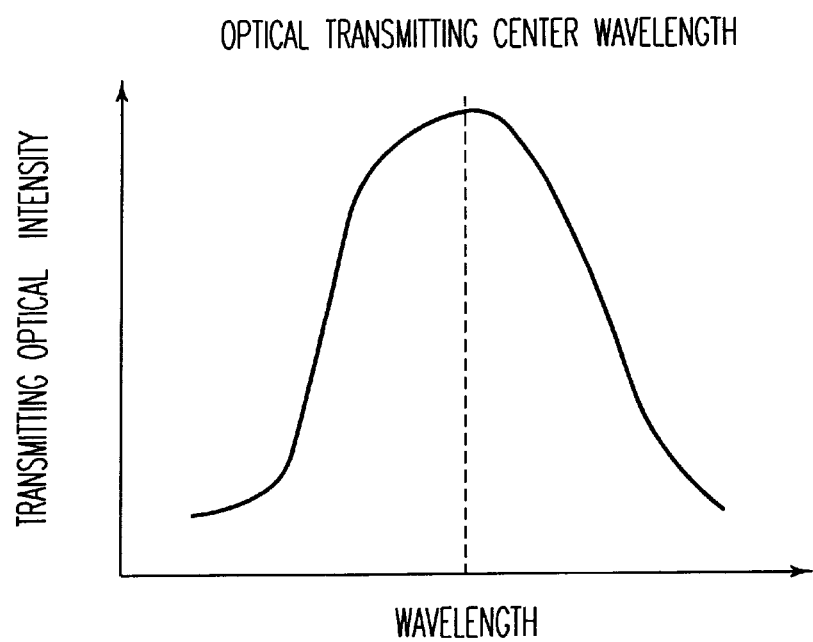
FIG. 12 is a graph showing an optical transmitting characteristic of the light which is output from one single optical output waveguide in the AWG.

The arrayed waveguide grating according to the above mentioned embodiments of the invention may be suitably utilized, for example, in the WDM system and so on. For example, referring to FIG. 10, a communication unit 60 connects a MULTIPLEXING/DEMULTIPLEXING unit 62 and a DEMULTIPLEXING/MULTIPLEXING unit 64. The communication unit 60 includes at least any one of a point-to-point element, an optical ADM element or an optical XC element. The arrayed waveguide grating may be provided in any of the communication unit 60, the MULTIPLEXING/DEMULTIPLEXING unit 62 and DEMULTIPLEXING/MULTIPLEXING unit 64.

Obviously, numerous modifications and variations of the present invention are possible in light of the above teachings. It is therefore to be understood that, within the scope of the appended claims, the invention may be practiced otherwise than as specifically described here.

What is claimed as new and desired to be secured by Letters Patent of the United States is:

1. An arrayed waveguide grating through which light travels, comprising:

at least one first optical waveguide means for transmitting the light;

a first slab waveguide means for diffracting or focusing the light;

a plurality of arrayed waveguide means for shifting phase of the light, the plurality of arrayed waveguide means being connected to said at least one first optical waveguide means via said first slab waveguide means, each of said plurality of arrayed waveguide means having a different length;

a second slab waveguide means for focusing or diffracting the light;

a plurality of second optical waveguide means for transmitting the light, the plurality of second optical waveguide means being connected to said plurality of arrayed waveguide means via the second slab waveguide means, at least one of said first and second slab waveguide means being partitioned to first and second segments at a partition surface intersecting a path of the light; and a slide means for sliding at least one of the first and second segments along the partition surface to compensate an optical transmitting center wavelength of the light according to a temperature of the arrayed waveguide grating.

2. An arrayed waveguide grating through which light travels, comprising:

at least one first optical waveguide;

a first slab waveguide;

a plurality of arrayed waveguides connected to said at least one first optical waveguide via said first slab waveguide, each of said plurality of arrayed waveguides having a different length;

a second slab waveguide;

a plurality of second optical waveguides connected to said plurality of arrayed waveguides via the second slab waveguide, at least one of said first and second slab waveguides being partitioned to first and second segments at a partition surface intersecting a path of the light; and a moving member configured to slide the at least one of the first and second segments along the partition surface to compensate an optical transmitting center wavelength of the light according to a temperature of the arrayed waveguide grating, the moving member including an expanding and contracting material which is configured to expand or contract corresponding to a change in the temperature by an amount corresponding to a shift of the optical transmitting center wavelength caused by the change in the temperature.

3. An arrayed waveguide grating according to claim 2, wherein the partition surface is substantially perpendicular to the path of the light.

4. An arrayed waveguide grating according to claim 2, wherein the partition surface is oblique to the path of the light.

5. An arrayed waveguide grating according to claim 2, wherein the light is input from one of said at least one first optical waveguide, and wherein at least one of the first and second segments is configured to be slid along the partition surface to compensate the optical transmitting center wavelength of the light traveling through each of the plurality of second optical waveguides according to the temperature of the arrayed waveguide grating.

6. An arrayed waveguide grating according to claim 2, wherein the light is input from the plurality of second optical waveguides and wherein at least one of the first and second segments is configured to be slid along the partition surface to compensate the optical transmitting center wavelength of the light traveling through one of said at least one first optical waveguide according to the temperature of the arrayed waveguide grating.

7. An arrayed waveguide grating according to claim 2, wherein said first slab waveguide is partitioned to the first and second segments.

8. An arrayed waveguide grating according to claim 2, wherein said second slab waveguide is partitioned to the first and second segments.

9. An arrayed waveguide grating through which light travels, comprising:

at least one first optical waveguide;

a first slab waveguide;

a plurality of arrayed waveguides connected to said at least one first optical waveguide via said first slab waveguide, each of said plurality of arrayed waveguides having a different length;

a second slab waveguide;

a plurality of second optical waveguides connected to said plurality of arrayed waveguides via the second slab waveguide, at least one of said first and second slab waveguides being partitioned to first and second segments at a partition surface intersecting a path of the light;

a moving member configured to slide the at least one of the first and second segments along the partition surface;

a temperature sensor configured to detect a temperature of the arrayed waveguide grating; and a controller configured to control a movement of the moving member based on the temperature detected by the temperature sensor to compensate an optical transmitting center wavelength of the light.

10. An arrayed waveguide grating according to claim 9, wherein the partition surface is substantially perpendicular to the path of the light.

11. An arrayed waveguide grating according to claim 9, wherein the partition surface is oblique to the path of the light.

12. An arrayed waveguide grating according to claim 9, wherein the light is input from one of said at least one first optical waveguide, and wherein at least one of the first and second segments is configured to be slid along the partition surface to compensate the optical transmitting center wavelength of the light traveling through each of the plurality of second optical waveguides according to the temperature of the arrayed waveguide grating.

13. An arrayed waveguide grating according to claim 9, wherein the light is input from the plurality of second optical waveguides and wherein at least one of the first and second segments is configured to be slid along the partition surface to compensate the optical transmitting center wavelength of the light traveling through one of said at least one first optical waveguide according to the temperature of the arrayed waveguide grating.

14. An arrayed waveguide grating according to claim 9, wherein said first slab waveguide is partitioned to the first and second segments.

15. An arrayed waveguide grating according to claim 9, wherein said second slab waveguide is partitioned to the first and second segments.

16. A method for compensating an optical transmitting center wavelength of light which travels through an arrayed waveguide grating which includes a plurality of arrayed waveguides connecting a first slab waveguide and a second slab waveguide, the method comprising:

partitioning at least one of said first and second slab waveguides to first and second segments at a partition surface intersecting a path of the light; and expanding and contracting an expanding and contracting material according to a temperature of the arrayed waveguide grating to slide at least one of the first and second segments along the partition surface to compensate an optical transmitting center wavelength of the light.

17. A method for compensating an optical transmitting center wavelength of light which travels through an arrayed waveguide grating which includes a plurality of arrayed waveguides connecting a first slab waveguide and a second slab waveguide, the method comprising:

partitioning at least one of said first and second slab waveguides to first and second segments at a partition surface intersecting a path of the light;

providing a moving member configured to slide the at least one of the first and second segments along the partition surface;

detecting a temperature of the arrayed waveguide grating; and controlling a movement of the moving member based on the detected temperature to compensate an optical transmitting center wavelength of the light.

18. A wavelength division multiplexing system comprising:

a MUX/DEMUX unit;

a DEMUX/MUX unit;

a communication unit including at least any one of a point-to-point element, an optical ADM element or an optical XC element; and an arrayed waveguide grating through which light travels, the arrayed waveguide grating comprising:

at least one first optical waveguide;

a first slab waveguide;

a plurality of arrayed waveguides connected to said at least one first optical waveguide via said first slab waveguide, each of said plurality of arrayed waveguides having a different length;

a second slab waveguide;

a plurality of second optical waveguides connected to said plurality of arrayed waveguides via the second slab waveguide, at least one of said first and second slab waveguides being partitioned to first and second segments at a partition surface intersecting a path of the light; and a moving member configured to slide the at least one of the first and second segments along the partition surface to compensate an optical transmitting center wavelength of the light according to a temperature of the arrayed waveguide grating, the moving member including an expanding and contracting material which is configured to expand or contract corresponding to a change in the temperature by an amount corresponding to a shift of the optical transmitting center wavelength caused by the change in the temperature.

19. A wavelength division multiplexing system comprising:

a MUX/DEMUX unit;

a DEMUX/MUX unit;

a communication unit including at least any one of a point-to-point element, an optical ADM element or an optical XC element; and an arrayed waveguide grating through which light travels, the arrayed waveguide grating comprising:

at least one first optical waveguide;

a first slab waveguide;

a plurality of arrayed waveguides connected to said at least one first optical waveguide via said first slab waveguide, each of said plurality of arrayed waveguides having a different length;

a second slab waveguide;

a plurality of second optical waveguides connected to said plurality of arrayed waveguides via the second slab waveguide, at least one of said first and second slab waveguides being partitioned to first and second segments at a partition surface intersecting a path of the light; and a moving member configured to slide the at least one of the first and second segments along the partition surface;

a temperature sensor configured to detect a temperature of the arrayed waveguide grating; and a controller configured to control a movement of the moving member based on the temperature detected by the temperature sensor to compensate an optical transmitting center wavelength of the light.

20. An arrayed waveguide grating through which light travels, comprising:

a first slab waveguide;

a second slab waveguide;

a plurality of arrayed waveguides connecting said first slab waveguide and said second slab waveguide, each of said plurality of arrayed waveguides having a different length, at least one of said first and second slab waveguides being partitioned to first and second segments at a partition surface intersecting a path of the light; and a moving member configured to slide the at least one of the first and second segments along the partition surface to compensate an optical transmitting center wavelength of the light according to a temperature of the arrayed waveguide grating, the moving member including an expanding and contracting material which is configured to expand or contract corresponding to a change in the temperature by an amount corresponding to a shift of the optical transmitting center wavelength caused by the change in the temperature.

21. An arrayed waveguide grating through which light travels, comprising:

a first slab waveguide;

a second slab waveguide;

a plurality of arrayed waveguides connecting said first slab waveguide and said second slab waveguide, each of said plurality of arrayed waveguides having a different length, at least one of said first and second slab waveguides being partitioned to first and second segments at a partition surface intersecting a path of the light;

a moving member configured to slide the at least one of the first and second segments along the partition surface;

a temperature sensor configured to detect a temperature of the arrayed waveguide grating; and a controller configured to control a movement of the moving member based on the temperature detected by the temperature sensor to compensate an optical transmitting center wavelength of the light.

* * * * *